United States Patent Office 2,902,465
Patented Sept. 1, 1959

2,902,465

STABILIZERS FOR VINYL HALIDE POLYMERS

Abraham Bavley, Brooklyn, and Charles J. Knuth, Flushing, N.Y., and Max W. Miller, North Stonington, Conn., assignors to Chas. Pfizer & Co., Inc., Brooklyn, N.Y., a corporation of Delaware No Drawing. Application August 22, 1957
Serial No. 679,752

6 Claims. (Cl. 260—45.8)

This invention is concerned with the stabilization of vinyl halide polymers. More particularly, it relates to the stabilization of polyvinyl halide polymers against degradation by heat and light and also to the heat and light stabilized compositions produced thereby.

Vinyl halide polymers such as the commercially important polyvinyl chloride and its copolymers are markedly subject to degradation when exposed to heat and light. The degradation is evidenced by considerable discoloration which may also be accompanied by the development of brittleness and loss of strength. This degradation is more particularly noted in product fabrication processes wherein elevated temperatures, for example, from about 130° C. and higher, are employed for prolonged periods of time. Further, the finished product in service may be subject to heat and light degradation. In the fabrication of products made from polyvinyl chloride polymers, waste scraps are salvaged and re-utilized. Frequently, unless stabilized, these waste scraps undergo further degradation in reprocessing. There is then in the art a need for a stabilizer which imparts both heat and light stability, and at the same time, is free from other limitations as set forth below.

In the embodiment of this invention the term vinyl halide polymers, encompasses polymerized polyvinyl halide and copolymers thereof, such as vinyl chloride copolymers with vinyl esters, acrylic compounds or vinylidene chloride, such copolymers being well known in the art. The preferred polyvinyl halide polymers include those containing at least 50% by weight of vinyl chloride.

In general, vinyl halide polymer stabilizers are limited in application. They usually serve either as heat stabilizers or light stabilizers but rarely are possessed of significant heat and light stabilizing properties at the same time. For example, cadmium and zinc soaps and tin organic compounds effect good heat stability but only slight light stability. At times the toxicity of a stabilizer, as in the case of lead compounds, limits its use. Further many tin compounds are skin irritants which detracts considerably from their desirability. Many of the metals used in stabilizers, for example, lead and cadmium, react with sulfide to impart undesirable colors to the plastic thus limiting their use in commercial products. It has now been found that metal salts of epoxysuccinic acid are excellent stabilizers for plastics, and, at the same time, in their use are not hampered by the above mentioned limitations. The alkali metal and alkaline earth metal salts of this acid are particularly suitable as stabilizers for polyvinyl halide polymers.

The composition of the present invention may be produced by mixing the metal salt of epoxysuccinic acid with the powdered resins for fabricating into the desired product form. For example, in preparing flexible plastic sheets from vinyl chloride polymers such as polyvinyl chloride and the copolymers of vinyl chloride and vinyl acetate, the epoxysuccinate metal salt is added to the finely powdered resins in percentages ranging from 0.5% to 10% by weight of the vinyl chloride polymers. As is the procedure commonly employed in the art, a suitable plasticizer, for example, dioctyl phthalate, tricresyl phosphate, dioctyl adipate, and others may then be added. The thoroughly blended mixtures are then charged to a two roll mill and heated at a temperature from about 130° to 160° C. This process is commonly employed and familiar to those in the art. The mixtures are thoroughly fluxed and mixed until a uniform sheet is obtained. The stability of the resultant flexible sheets is measured using standard accelerated test procedures well known to those in the art. For instance, a typical accelerated test for light stability is exposure of a specimen to ultraviolet light as in the Atlas Fadeometer for specific time intervals. The specimens are examined for evidence of breakdown, for example, the development of discoloration and brittleness in the flexible sheets of the specimen. A second accelerated test involves evaluating the heat stabilization of the plastic sheet specimen. For this purpose, samples of the specimens are placed in an oven at elevated temperatures ranging from 150° C. to 180° C. Samples are removed at hourly intervals for a total of about 8 hours and inspected for discoloration or other evidence of degradation.

It is noteworthy that in milling the plastic compositions, no appreciable discoloration is noted in the flexible sheet when prolonged periods of time are employed. Further, when reprocessing salvaged pieces of flexible sheets, no discoloration is noted. The compounds of this invention considerably retard degradation of the flexible plastic sheets by heat and light. In comparison with specimens containing no stabilizer in the heat stability test, the compounds of this invention impart almost perfect stabilization for periods of at least 1 hour at a temperature of 160° C. Further stabilizing effect is noted at successively longer time intervals although discoloration does take place. Generally, only slight discoloration is noted for time periods up to 7 hours. In comparison, a plastic compostion not containing the compounds of this invention turned dark brown in a matter of minutes at this elevated temperature. In the light stability test, plastic compositions containing the compounds of this invention showed remarkable stability. In comparison with compositions containing no stabilizer, sodium epoxysuccinate imparted a light stability of 140 hours to plastic compositions. The composition containing no stabilizer turned very dark brown in 20 hours.

The epoxysuccinate metal salts of this invention are the alkali metal and alkaline earth metal salts. Of the former the sodium salt is preferred although other alkali metal salts, for example, the potassium and lithium salt are to be considered within the purview of this invention. These salts are prepared using standard methods such as reacting the desired metal carbonates with epoxysuccinic acid which is obtained by a fermentation method described in U.S. Patent 2,674,561. The preferred percentages of the salts of epoxysuccinic acid range from 0.5% to about 10% by weight of the vinyl halide polymer. Larger quantities of the stabilizers may be used but no appreciable advantage is realized in so doing. Lesser amounts of the stabilizers, for example, 0.1% by weight, of course, will impart improved stability. The stabilizers are found to be readily dispersible in the plastic compositions, and may be added before or during the milling process with comparable efficiency.

The following examples are given by way of illustration and are not to be construed as limitations of this invention many variations of which are possible within the scope or spirit thereof.

EXAMPLE I

Plastic formulations were prepared by admixing 60 parts of vinyl chloride polymers, such as a vinyl chloride (95%), vinyl acetate (5%) copolymer and 30 parts of a plasticizer (in this example, dioctyl phthalate), and 0.5 part of a lubricant (stearic acid). To each of these formulations, 0.9 part of a stabilizer was added. Each mixture was thoroughly blended by hand mixing and charged to a two roll mill, heated to a surface temperature of about 130° C. The mixture was thoroughly fluxed and mixed for about 5 minutes and removed from the mill in the form of a uniform flexible sheet of 0.025 inch thickness. Test specimens of the flexible sheets were then subjected to heat stability test in the presence of air by placing in an oven maintained at 160° C. Specimens were removed periodically and examined for discoloration. The results are recorded in Table I.

Table I

| Stabilizer | Exposure to 160° C. for— | | | | | | |
|---|---|---|---|---|---|---|---|
| | 1 hr. | 2 hrs. | 3 hrs. | 4 hrs. | 5 hrs. | 6 hrs. | 7 hrs. |
| Sodium epoxysuccinate | A | B | B | C | D (spots) | D (spots) | D (spots) |
| Barium epoxysuccinate | A | B | B | C | C | C | C |
| Calcium epoxysuccinate | A | B | B | D | D | D | E (spots) |
| Blank | E | E | E | E | E | E | E |

Test specimens of the flexible sheets were also subjected to light stability test in the Atlas Fadeometer for 20 hour periods. Specimens containing no stabilizer were dark-brown at the end of the first 20 hour period while specimens containing the stabilizers mentioned above required up to 40 hours for noticeable discoloration to be developed.

EXAMPLE II

The procedure of Example I was followed employing 4.5 parts of the stabilizer for every 60 parts of a polyvinyl chloride resin known to the art as "Geon Resin 101." As in Example I, 30 parts of a plasticizer was added. The results of heat stability tests are given in Table II. All specimens were tested as in Example I.

In the Atlas Fadeometer, for the same time periods as in Example I, the stabilizers showed remarkable control of discoloration, particularly in the case of sodium epoxysuccinate where initial discoloration did not occur until exposure of 140 hours.

Table II

| Stabilizer | Exposure to 160° C. for— | | | | | | |
|---|---|---|---|---|---|---|---|
| | 1 hr. | 2 hrs. | 3 hrs. | 4 hrs. | 5 hrs. | 6 hrs. | 7 hrs. |
| Sodium epoxysuccinate | B | B | B | B | B | B | B |
| Barium epoxysuccinate | A | B | D | D | E (spots) | E (spots) | E (spots) |
| Calcium epoxysuccinate | A | A | D | D | D | D | D |
| Blank | E | E | E | E | E | E | E |

A—equal to no discoloration.
B—equal to very pale straw (almost imperceptible).
C—equal to straw.
D—equal to yellow.
E—equal to dark-brown.
("Spots" indicates the development of pinpoints of discoloration.)

EXAMPLE III

The epoxysuccinate salts are prepared by treating epoxysuccinic acid, obtained by the method described in U.S. Patent 2,674,561, with equivalent amounts of the desired metal carbonates in aqueous solution.

What is claimed is:
1. A plastic composition comprising a vinyl chloride polymer together with from 0.1% to 10% by weight based on the polymer of a salt selected from the group consisting of the alkali metal and alkaline earth metal salts of epoxysuccinic acid.
2. A plastic composition as claimed in claim 1 wherein the vinyl chloride polymer is polyvinyl chloride.
3. A plastic composition as claimed in claim 1 wherein the alkali metal is sodium.
4. A plastic composition as claimed in claim 1 wherein the alkaline earth metal is barium.
5. A plastic composition as claimed in claim 1 wherein the alkaline earth metal is calcium.
6. A plastic composition as claimed in claim 1 wherein the selected salt is present in an amount from 0.5% to 10% by weight of the polymer.

References Cited in the file of this patent

UNITED STATES PATENTS 2,684,353    Greenspan _____ July 20, 1954